Figure 1:
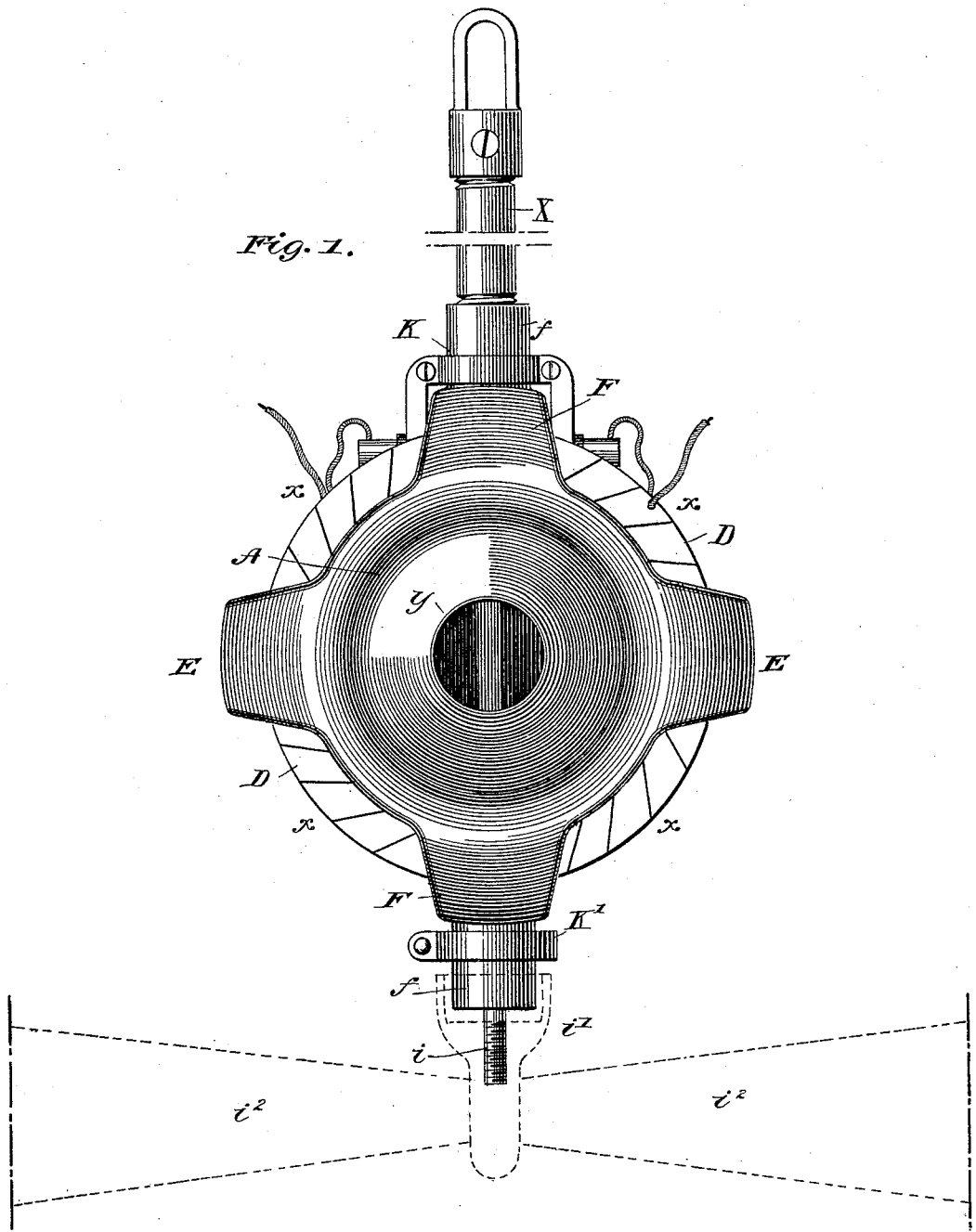

(No Model.)

3 Sheets—Sheet 1.

J. F. DENISON.
ELECTRIC MOTOR.

No. 523,140.

Patented July 17, 1894.

WITNESSES:
Frank S. Ober
Alfred W. Van Zee

INVENTOR
Julian F. Denison
BY Baldwin, Davidson & Wight
ATTORNEYS.

(No Model.)  
3 Sheets—Sheet 2.
J. F. DENISON.
ELECTRIC MOTOR.
No. 523,140. Patented July 17, 1894.
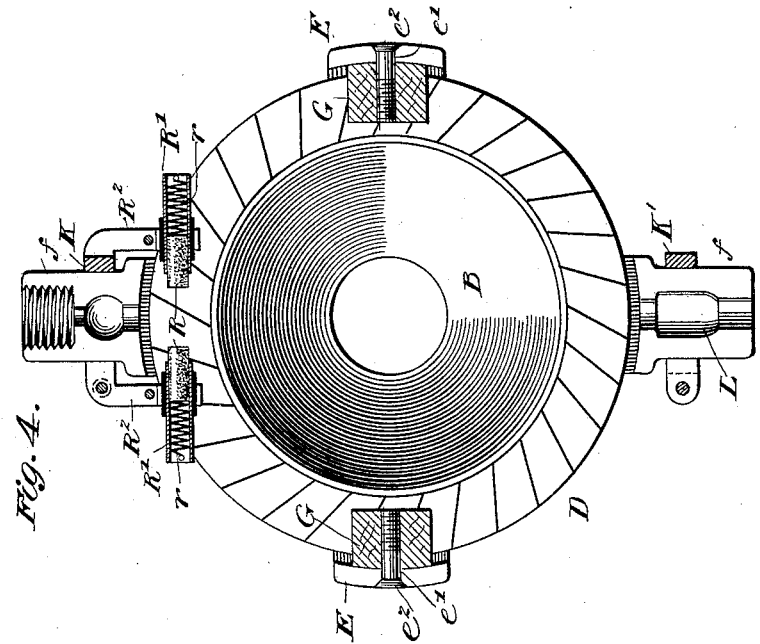
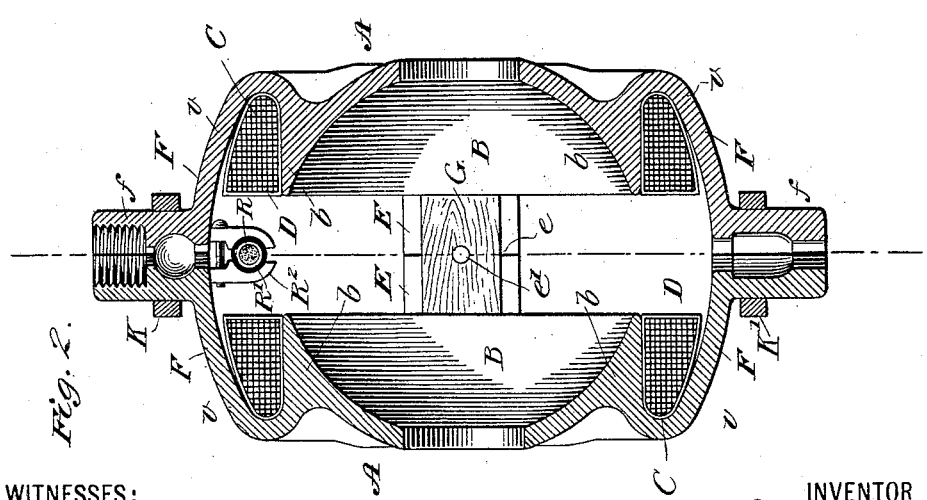
WITNESSES:
Frank S. Ober
Alfred W. Van Zee.
INVENTOR
Julian F. Denison
BY Baldwin, Davidson & Wight
ATTORNEYS.

(No Model.) 3 Sheets—Sheet 3.
J. F. DENISON.
ELECTRIC MOTOR.
No. 523,140. Patented July 17, 1894.
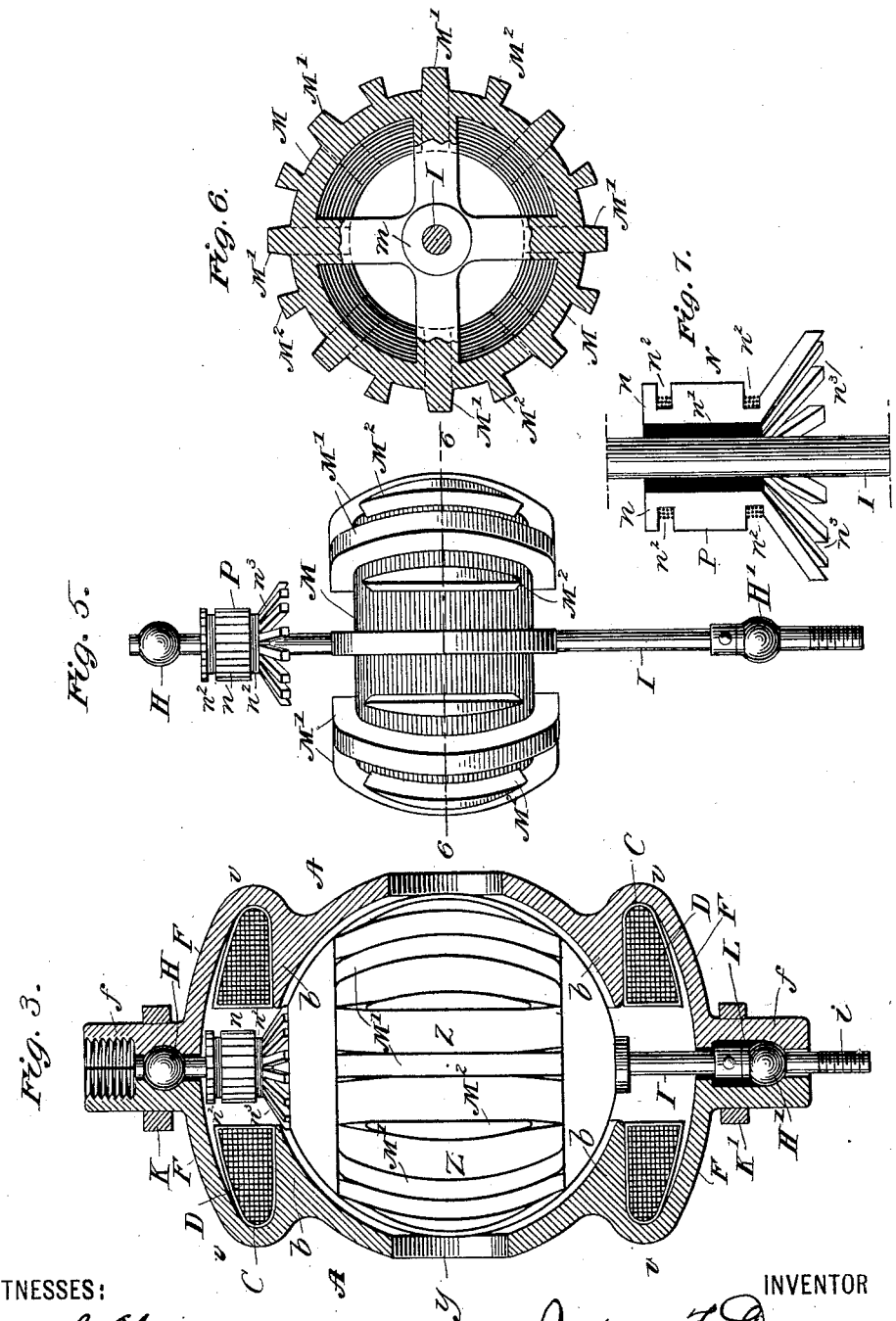
WITNESSES:
Frank S. Obr.
Alfred W. Van Zee.
INVENTOR
Julian F. Denison
BY
Baldwin, Davidson & Wight
ATTORNEYS.

UNITED STATES PATENT OFFICE.

JULIAN F. DENISON, OF NEW HAVEN, CONNECTICUT, ASSIGNOR TO THE BACKUS MANUFACTURING COMPANY, OF NEW JERSEY.

ELECTRIC MOTOR.

SPECIFICATION forming part of Letters Patent No. 523,140, dated July 17, 1894.

Application filed April 6, 1894. Serial No. 506,546. (No model.)

*To all whom it may concern:*

Be it known that I, JULIAN F. DENISON, a citizen of the United States, residing in New Haven, county of New Haven, and State of Connecticut, have invented certain new and useful Improvements in Electric Motors, of which the following is a specification.

The motor is designed more especially for driving ceiling fans, and is therefore constructed in such manner that it may be suspended by a suitable support, the fan blades being connected with the lower end of the vertical armature shaft.

The primary purpose of the invention is cheapness of manufacture coupled with compact construction, durability and suitable efficiency. I have constructed the field frame in two parts, each with a pole-face or field-pole formed by the body of the frame as distinguished from a projection thereon, and with an annular recess or seat, for the reception of the field coil, in the inner face of each part, surrounding the field pole. Each concave field pole face in central section conforms to a section of a sphere and is approximately hemi-spherical in outline. The exterior shape of each casting forming half of the frame approximately conforms to the interior shape. To avoid the presence of unnecessary metal in the frame, each half is cut away in the quadrants formed by two lines bisecting it and vertical to each other, and for the same reason the frame at the center of the field pole has a circular opening in it. At four points on each half section of the frame are inward projections which abut and hold the halves in such relation as to form an interior spherical chamber, in which a correspondingly shaped armature rotates. Two of these projections lying in the vertical line of suspension of the motor, are formed with semi-tubular extensions which are clamped together by clips or rings, and one of such clips forms the brush holder. Between such semi-tubular extensions the short armature shaft has its ball bearings and the interior of the tube formed by the upper pair of extensions is screw-threaded to receive the suspending rod.

The armature core may be cast in one piece. It is hollow and formed with a supporting spider at the center for the reception of the armature shaft, to which it is keyed. Its exterior surface is barrel shaped, dropping at each end toward the axial line, and is formed with ribs or projections alternately large and small, between which the winding is placed.

The commutator is of a peculiar construction, hereinafter described.

A further object in the construction of the motor is, while reducing its size to a minimum, to afford an exterior shape that lends itself to ornamentation, that is to say, such a shape as permits of the use of an ornamental envelope of spherical or pear shape.

Figure 8:
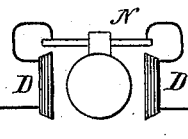

In the accompanying drawings—Figure 1 is a view in elevation; Fig. 2 a longitudinal section on a line at right angles to the joint between the sections of the frame with the armature removed; Fig. 3 a similar view with the armature in position; Fig. 4 a face view looking at the interior of one of the frame sections with the field coil in position. Fig. 5 is an elevation showing the armature core, shaft and commutator without the winding; Fig. 6 a cross-section through the same on the line 6, 6, of Fig. 5. Fig. 7 is a longitudinal section through the commutator showing the shape of the commutator bars, and the manner of mounting and securing them, and Fig. 8 is a diagram showing the circuit connections.

A A represent the halves of the frame section, which also form the field magnet cores. Each of said sections is formed with an approximately hemi-spherical recess B, surrounded by an annular recess C for the reception of the field magnet coil D.

As will be observed from the drawings, the face of the recess B practically conforms to the exterior of the frame section, except at the point $b$ where an additional amount of metal is preferably introduced for the formation of the annular field magnet coil recess. At four points, projections E E, F F extend outwardly and inwardly from the central portion of the frame section. These projections E E abut, as shown at $e$, and a hole $e'$ is tapped through the joint so that a screw $e^2$ may be inserted through the aperture into a block of wood G, that is interposed between the opposite field coils, and holds them firmly in position. The other opposite projections F are formed with semi-tubular right angle extensions $f$. Those at the upper end, or point of suspension of the motor, are each screw threaded at the end for the reception of a suspending rod X, and beneath the screw-thread, each extension is formed with an approximately hemi-spherical recess so that the two form a spherical seat for a bearing ball H on the upper end of the armature shaft I. The two casings forming the frame are clamped together by an annular clip K surrounding the parts $ff$. The lower semi-tubular extensions $f$ are recessed as shown, so as to form between them an elongated chamber L, the bottom of which is hemi-spherical and forms a seat for a bearing ball H' fast on the lower end of the armature shaft, and these two extensions are clamped together by a clip K'.

The sections of the frame are cut away or open at $x$ and are also cut away centrally as at $y$ for the purpose hereinbefore mentioned. These openings serve the additional purpose of providing for the ventilation of the armature and field coils. The lower end of the armature shaft at $i$ is screw-threaded, for the reception of an oil cup $i'$, shown in dotted lines in Fig. 1, and to which the fan blades $i^2$ may be attached, adjustably or otherwise, in any suitable manner. This cup being charged with oil, the lower bearing H' runs constantly in oil. The upper bearing H will be formed with surfaces of antifriction material.

The armature core M is clearly shown in Figs. 5 and 6. It is hollow and is formed with a central spider $m$ for the reception of the armature shaft I. Its exterior surface is curved as described in longitudinal section, is formed with a series of correspondingly curved ribs M', and between them are located shorter ribs $M^2$, the latter being preferably tapered or wedge shaped at each end.

The windings Z of the armature, which may be of any suitable character, lie between the ribs M' $M^2$, and when the core is wound the armature is of spherical shape as shown in Fig. 3. The tapered or wedge shaped ends of the shorter ribs permit the proper crossings of the coils at the ends of the core or barrel, and permit the winding in such manner as to produce a spherical armature. Any spherical armature, however, may be used in this motor, and the construction of the frame and field magnets is not dependent in any way upon the construction of the armature.

The commutator N is shown in Figs. 3 and 7. It is formed of a series of segmental bars $n$, built up into cylindrical form, around a bushing of insulating material $n'$ surrounding the shaft I. Near its opposite ends and on the outer side, each bar is formed with a recess $n^2$, to receive a winding of any suitable number of servings or wrappings of silk thread or cord, to bind the commutator bars together. These windings are depressed below the outer surface of the bars, so that they may be covered with a coating of shellac or asphaltum, or other suitable material, and the commutator may then be placed in a lathe and its face P be properly turned down. Of course sheets of mica or other insulating material are placed between the commutator bars. Each bar is formed with an inclined radial projection $n^3$ for the attachment of the terminals of the windings of the armature, by soldering or otherwise.

The commutator brushes are shown as formed of rods of carbon R, mounted in metal tubes R', supported in and insulated from arms $R^2$, preferably formed in one piece, with the upper clip or clamp K and extending longitudinally with the armature shaft, between opposite field coils, and into proper relation with the commutator. The carbon brushes are normally pressed outwardly against the commutator by coil springs $r$, within the tube, this latter being a usual construction.

In practice, I intend that the motor shall be enveloped in an ornamental metal sheath of spherical or other form, and that the suspending rod shall also be enveloped in an ornamental tube. The wires leading to the motor may pass down within this tube, and between it and the suspending rod X.

I prefer that the circuit connections of the motor shall be as indicated in Fig. 8, that is, that the field coils and armatures shall be in series with the armature between the two field coils.

It will be noted that the frame piece or field magnet cores are of substantially uniform thickness, and that the exterior thereof conforms substantially to the interior formation. I therefore not only avoid the use of superfluous and unnecessary metal, but at the same time reduce the diameter of the motor to the smallest limits, since the transverse diameter through the axis of the field poles only exceeds the diameter of the spherical armature by the uniform thickness of the frame on each side, and the small clearance space required for the armature. The field magnet coils C being circular in form, may be readily wound in a lathe. In cross-section they are thinner at the edge lying in the bottom of the recess, and the recess is correspondingly shaped. This is done for the purpose of avoiding an unnecessary enlargement of the frame at the points marked $v$. Each coil of the armature may also be wound by centering the armature core in a lathe, the points of support being in the outer faces of the ribs M' $M^2$.

Of course instead of ball bearings, the enlargement on the armature shaft may be of any suitable shape, for instance, the bearing surface thereof may be tapering or flat.

I claim as my invention—

1. In an electric motor, the longitudinally divided field magnet frame, composed of two halves or sections, each having formed in its inner face an approximately hemi-spherical recess, the face of which constitutes the field magnet pole, surrounded by an annular recess for the reception of the field magnet coil, the exterior face of the section conforming in shape approximately to the interior face, inwardly extending projections at the opposite ends of each section, and a semi-tubular extension from each projection, formed with bearings for an armature shaft, in combination with means for clamping the semi-tubular extensions at each end together, an armature shaft rotating in the bearings, formed in the semi-tubular extensions, and an armature thereon revolving in the spherical chamber formed by the two hemi-spherical recesses.

2. In an electric motor, the longitudinally divided field magnet frame, composed of two halves or sections, each having semi-tubular extensions at each end, means for clamping such extensions to bind the halves of the frame together, each of such sections being of approximately uniform thickness, and of an exterior shape approximately conforming to the interior shape, and each having in its inner face an approximately hemi-spherical recess, surrounded by an annular recess, in combination with a field magnet coil located in each of said annular recesses, an armature revolving in the spherical chamber, formed by the two hemi-spherical recesses, and the spherical or ball bearings of the armature shaft, formed by the interior faces of said semi-tubular extensions.

3. In an electric motor, the longitudinally divided field magnet frame, composed of two halves or sections, each formed with semi-tubular abutting extensions at each end, the tube thus formed at the top of the motor being tapped or screw-threaded for the reception of a suspension rod, and having below such screw-thread a bearing for the armature shaft, and the tube formed at the lower end of the motor by the semi-tubular extensions having formed therein a bearing for the armature shaft, in combination with an armature rotating in a chamber, formed by the two sections, its vertical shaft supported in said bearings, and field magnet coils located in annular recesses in the inner faces of the frame sections.

4. In an electric motor, the longitudinally divided field magnet frame, composed of two parts or sections, each section having a central portion of corresponding interior and exterior conformation, the interior being formed with an approximately hemi-spherical recess for the armature, and a surrounding annular recess for the field magnet coil, and with radiating, inwardly extending projections E E, F F, the latter being formed with semi-tubular extensions $ff$, clamps for binding the semi-tubular extensions together, a spherical armature revolving in the spherical chamber formed by the two frame sections, a shaft having its bearings in the tubes formed at each end by the semi-tubular extensions, a suspending rod attached to the upper tubular extension $f$, an oil cup secured to the lower end of the armature shaft below the lower extensions $f$, and fan blades carried by the oil cup.

5. The combination of the longitudinally divided field magnet frame, composed of two parts or sections, each formed with semi-tubular extensions at its opposite ends, clamps for binding together the contiguous semi-tubular extensions, one of said clamps being formed with brush holders extending between the frame sections, an armature revolving on bearings formed by the semi-tubular extensions, its commutator, and field magnet coils located in annular recesses in the inner faces of the frame sections.

6. A barrel shaped armature core, substantially such as herein described, having a face curved in longitudinal section with alternate long and short ribs thereon in the grooves between which are to be wound the armature coils.

7. The divided field magnet frame composed of two parts united in the plane of the armature axis, each part having an approximately hemi-spherical recess surrounded by an annular recess and the exterior formation of the part conforming to its interior shape, in combination with a spherical armature, and field coils lying in said annular recesses, substantially as set forth.

In testimony whereof I have hereunto subscribed my name.

JULIAN F. DENISON.

Witnesses:
A. B. DENISON,
C. E. HOADLEY.